United States Patent
Ehresman

(10) Patent No.: US 7,578,279 B2
(45) Date of Patent: Aug. 25, 2009

(54) FUEL INJECTION SPARK IGNITION SYSTEM

(75) Inventor: Thomas Emanuel Ehresman, Loveland, CO (US)

(73) Assignee: Point-Man Aeronautics, LLC, Loveland, CO (US)

( * ) Notice: Subject to any disclaimer, the term of this patent is extended or adjusted under 35 U.S.C. 154(b) by 337 days.

(21) Appl. No.: 11/664,709

(22) Filed: Apr. 4, 2007

(65) Prior Publication Data

US 2007/0261676 A1     Nov. 15, 2007

Related U.S. Application Data

(63) Continuation-in-part of application No. PCT/US2005/035555, filed on Oct. 3, 2005, which is a continuation-in-part of application No. 10/960,854, filed on Oct. 6, 2004, now Pat. No. 7,131,423.

(51) Int. Cl.
    *F02M 57/06*     (2006.01)
(52) U.S. Cl. .................................. 123/297; 123/490
(58) Field of Classification Search ............. 123/297, 123/435, 490, 494, 299, 300; 239/585.1
See application file for complete search history.

(56) References Cited

U.S. PATENT DOCUMENTS

| | | |
|---|---|---|
| 3,777,977 A | 12/1973 | Regneault et al. |
| 3,982,693 A | 9/1976 | Hulsing |
| 4,046,112 A | 9/1977 | Deckard |
| 4,129,253 A | 12/1978 | Bader, Jr. et al. |
| 4,129,254 A | 12/1978 | Bader, Jr. et al. |
| 4,129,255 A | 12/1978 | Bader, Jr. et al. |
| 4,129,256 A | 12/1978 | Bader, Jr. et al. |
| 4,317,541 A | 3/1982 | Beardmore |
| 4,392,612 A | 7/1983 | Deckard et al. |
| 5,628,293 A | 5/1997 | Gibson et al. |
| 2005/0211214 A1 * | 9/2005 | Tomita et al. ........... 123/145 A |

FOREIGN PATENT DOCUMENTS

| | | | |
|---|---|---|---|
| EP | 1530037 | * | 5/2005 |
| WO | WO 2004/015385 | * | 2/2004 |

OTHER PUBLICATIONS

PCT Patent Application No. PCT/US2005/035555, filed Oct. 3, 2005, entitled "Fuel Injection Spark Ignition System".
U.S. Appl. No. 10/960,854, filed Oct. 6, 2004, entitled "Fuel Injection Spark Ignition System".

* cited by examiner

*Primary Examiner*—Hai H Huynh
(74) *Attorney, Agent, or Firm*—Craig Miles; CR Miles, P.C.

(57) ABSTRACT

A fuel injection system providing both fuel injection devices (5) and methods of fuel injection for internal combustion engines (1) in which a piezoelectric material (29) generates a current discharged to ignite fuel (8) delivered into the engine combustion chamber (2).

29 Claims, 6 Drawing Sheets

FUEL INJECTION SPARK IGNITION SYSTEM

This United States National Stage application is a continuation-in-part of International Patent Cooperation Treaty Application No. PCT/US2005/03555, filed Oct. 3, 2005, which is a continuation-in-part of U.S. patent application Ser. No. 10/960,854, filed Oct. 6, 2004, now issued as U.S. Pat. No. 7,131,423, each hereby incorporated by reference herein.

I. Technical Field

A fuel injection system providing both fuel injection devices and methods of fuel injection for internal combustion engines in which a piezoelectric material generates a current discharged to ignite fuel delivered into the engine combustion chamber.

II. BACKGROUND

Fuel injectors convert fuel into a fine spray which is mixed with air in engine combustion chambers. The major advantage of the system is that the amount of fuel being mixed with air can be more precisely controlled and the mixture can be more evenly spread throughout the air coming into the engine. In combination with an electronic computer which monitors engine conditions and exhaust emissions, fuel injection can increase fuel efficiency and reduce pollution.

Fuel injection was adapted for use in petrol-powered aircraft during World War II and was first used in a car in 1955 with the introduction of the Mercedes-Benz 300SL Fuel injection became widespread with the introduction of electronically controlled fuel injection systems in the 1980s and the gradual tightening of emissions and fuel economy laws.

Today, fuel injection is conventionally used in diesel engines. The diesel engine is a type of internal combustion engine; more specifically, a compression ignition engine, in which the fuel is ignited by the high temperature of a compressed gas, rather than a separate source of energy, such as a spark plug. Many modern diesel engines use direct injection, in which the injection nozzle is located inside the combustion chamber. Today automobile manufacturers conventionally use fuel injection with gasoline engines.

A commonly used injector utilizes a closed-needle injector having a needle valve assembly which utilizes a spring-biased needle positioned adjacent to the orifice of a fuel metering chamber. The needle reciprocally operates to open and close communication between a fuel metering chamber and the engine combustion chamber allowing fuel to be injected into the cylinder and resisting blow back of exhaust gas into the fuel metering chamber of the injector. In many fuel systems, when the pressure of the fuel within the fuel metering chamber exceeds the biasing force of the needle spring, the needle moves outwardly to allow fuel to pass through the orifice(s) of the fuel metering chamber, thus marking the beginning of injection.

In another type of system disclosed by U.S. Pat. No. 5,676,114 to Tarr et al., the beginning of injection is controlled by a servo-controlled needle. The assembly includes a control volume positioned adjacent an outer end of the needle valve, a drain circuit for draining fuel from the control volume to a low pressure drain, and an injection control valve positioned along the drain circuit for controlling the flow of fuel through the drain circuit so as to cause the movement of the needle valve element between open and closed positions. Opening of the injection control valve causes a reduction in the fuel pressure in the control volume resulting in a pressure differential which forces the needle valve open, and closing of the injection control valve causes an increase in the control volume pressure and closing of the needle valve. U.S. Pat. No. 5,463,996 issued to Maley et al. discloses a similar servo-controlled needle valve injector.

U.S. Pat. No. 5,458,292 to Hapeman discloses a fuel injector with inner and outer injector needle valves biased to close respective orifices and operable to open at different fuel pressures. The inner needle valve is reciprocally mounted in a central bore formed in the outer needle valve. However, the opening of each needle valve is controlled solely by injection fuel pressure acting on the needle valve in the opening direction such that the valves necessarily open when the injection fuel pressure reaches a predetermined level.

United Kingdom Patent Application No. 2266559 to Hlousek discloses a closed needle injector assembly including a hollow needle valve for cooperating with one valve seat formed on an injector body to provide a main injection through all the injector orifices and an inner valve needle reciprocally mounted in the hollow needle for creating a pre-injection through a few of the injector orifices.

U.S. Pat. No. 5,199,398 to Nylund discloses a fuel injection valve arrangement for injecting two different types of fuels into an engine which includes inner and outer poppet type needle valves. During each injection event, the inner needle valve opens a first set of orifices to provide a pre-injection and the outer needle valve opens a second set of orifices to provide a subsequent main injection. The outer poppet valve is a cylindrical sleeve positioned around a stationary valve housing containing the inner poppet valve.

U.S. Pat. No. 5,899,389 to Pataki et al. discloses a fuel injector assembly including two biased valve elements controlling respective orifices for sequential operation during an injection event. A single control volume may be provided at the outer ends of the elements for receiving biasing fluid to create biasing forces on the elements for opposing the fuel pressure opening forces. However, the control volume functions in the same manner as biasing springs to place continuous biasing forces on the valve elements. As a result, the needle valve elements only lift when the supply fuel pressure in the needle cavity is increased in preparation of a fuel injection event to create pressure forces greater than the closing forces imparted by the control volume pressure.

Other types of injectors are coupled to a fuel supply which delivers fuel to a pump chamber within the fuel injector at a predetermined supply pressure, this pressure then being increased within the fuel injector to a higher injection pressure to effect actuation of the needle valve assembly. A commonly used means to increase pressure within the storage chamber includes plunger which reciprocates within the pump chamber which is actuated by an engine driven cam or other reciprocating means. Fuel in the pump chamber is delivered to the fuel metering chamber at a pressure sufficiently high to move the needle from the valve seat.

In one form of such a fuel injector, the plunger is provided with helices which cooperate with suitable ports in the pump chamber to control the pressurization and therefore the injection of fuel during a pump stroke of the plunger.

In another form of such a fuel injector, a solenoid valve is incorporated in the fuel injector so as to control, for example, the drainage of fuel from the pump chamber. In this latter type injector, fuel injection is controlled by energizing the solenoid valve. An exemplary embodiment of such an electromagnetic fuel injector is disclosed, for example, in U.S. Pat. No. 4,129,253 to Ernest Bader, Jr., John I. Deckard and Dan B. Kuiper.

Other types of fuel injection systems may use piezoelectric actuators or elements, in which the piezoelectric actuators or elements exhibit a proportional relationship between an applied voltage and a linear expansion. Thus, it is believed that using piezoelectric elements as actuators may be advantageous in fuel injection nozzles for internal combustion engines as disclosed by European Patent Specifications EP 0 371 469 B1 and EP 0 379 182 B1.

An example of a fuel injector which uses the expansion and contraction of piezoelectric elements with double-acting, double-seat valves to control corresponding injection needles in a fuel injection system is shown by German Patent Applications DE 197 42 073 A1 and DE 197 29 844 A1.

As can be understood from the above discussion, there is a large commercial market for fuel injectors for use in various types of reciprocating, rotary and other types of engines which has wide application in automotive and aircraft industries with respect to both compression ignition and spark ignition engines.

First, with respect to compression ignition engines, there is a compelling argument for stronger penetration in the market as a means of reducing $CO_2$ emissions. With the focus of the Kyoto Protocol on emissions of greenhouse gases, and the contribution of transportation sources to this problem. Moreover, compression ignition engines are able to extract almost double the useful work than conventional spark ignition engines.

However, while compression ignition is an attractive solution for CO2 reduction, exhaust emissions associated with diesel fuel are increasingly coming under the environmental spotlight. Most notable are the oxides of nitrogen (NOx) and particulate matter (PM), which are regarded almost exclusively as "diesel problems". The difficulty in meeting the increasingly stringent limitations on particulate and NOx emissions has stimulated interest in ethanol-fueled compression ignition engines because ethanol diffusion flames produce virtually no soot. Unfortunately ethanol does not have suitable ignition properties under typical diesel conditions because the temperatures and pressures characteristic of the diesel engines causes a longer ignition delay while using ethanol. Therefore, in order to make use of ethanol in a diesel engine, either a system to improve the ignition quality of ethanol or an ignition aid may be necessary.

Similarly, compression ignition engines can be operated with fuels made from other organic stock such as soybeans, rapeseed, and animal tallow produced through a process called transesterification which removes fatty particulates that cause coking and other problems in diesel engines. These additional bio-fuels used undiluted or mixed with diesel fuel have demonstrated reduced particulate emission. However, as the concentration of bio-fuel is increased cold engine start may require additional engine cranking and cold engine operation may be substantially inferior to diesel fuel. Similarly, in order to make use of bio-fuels either a system to improve the ignition quality of bio-fuels or an ignition aid may be necessary.

Second, with respect to lower compression spark ignition engines, the composition of fuels and the manner of operation, especially in automobiles, has significantly altered over the past thirty years. To meet air pollution regulations in the United States, and in other countries, the lead in gasoline was removed substantially lowering octane of the fuel. To compensate for the lowered octane, automobile manufacturers altered the timing in cars to prevent the resulting "ping" or "knock" and to reduce NOx formed at higher combustion temperatures and pressure.

In spark ignition engines, as you advance timing from top dead center, both peak combustion temperatures and peak cylinder pressures go down (as does "knock" and the production of NOx). At some point, however, spark ignition comes too early and the pressure produced from combustion works against the piston (on the up stroke) more than it works with the piston (on the down stroke).

In newer vehicles, how much fuel to deliver to the fuel combustion cylinder and when to provide ignition spark is typically monitored by computers which use sensors to detect engine "ping" or "knock" and to reduce emissions; however, the amount of ignition control that can be achieved under a broad range of operating conditions may be insufficient to completely eliminate "ping" or "knock" under certain circumstances, for example when low octane fuel is used. Also, the computer may be reacting to something that is already happening or has happened, and engine "ping" or "knock" has the potential to be harmful with relatively few occurrences.

Third, aviation remains the only transportation industry in the United States whose engine emissions are not yet regulated. The piston engine fleet uses the only fuel still containing lead as an octane enhancer. While turbine engine manufacturers have dedicated considerable resources to reduce engine emissions, the airline industry has experienced unprecedented growth and the aggregate pollution has increased dramatically. In addition to the problem caused locally by pollutants, fossil fuels used in aircraft worldwide have a significant impact on global warming because of the altitude at which they are emitted. Therefore, there are two pending crises in the aviation world: 1. the mounting pressure to remove lead from the aviation gasoline used by the piston engine fleet, and 2. the commercial aviation's environmental impact escalating both at the local and global level.

With the removal of lead from aviation fuel, use of the resulting lower octane fuel will require technical innovations to avoid "ping" and "knock". Because existing technology may not allow sufficient ignition control to eliminate "ping" and "knock" under certain circumstances and aircraft engines may then experience increased wear similar to that experienced in automobile engines using lower octane fuels.

Also, the Federal Aviation Administration has provided certifications for engines and aircraft powered by ethanol. Supplemental Type Certificates have also been issued for the use of 100% denatured ethanol for the IO-540 series of 260 HP Lycoming engines, for the O-235 series of Lycoming engines, and the Cessna 152 series of training aircraft. In May of 2000, dual fuel certification was obtained for a Piper Pawnee, an agricultural spray aircraft for the use of either ethanol or Avgas.

While aviation applications of bio-fuels are economically competitive with aviation fossil fuels, and are actually less expensive if the real cost of the fossil fuels is taken into account, the use of bio-fuels may be limited due to reduced performance of aviation engines under certain conditions as above-described and may require an ignition aid.

The instant invention can address certain aspects of the problems encountered by the use of lower octane or bio-fuels in fuel injected spark ignition engines.

III. DISCLOSURE OF INVENTION

Accordingly, a broad object of the invention can be to provide a fuel injector which further includes within the nozzle an electric current generator capable of discharging across a gap to provide spark ignition of fuel delivered to the fuel combustion chamber of a reciprocating piston or other type of engine.

Another broad object of the invention can be to provide an electric current generator configured from piezoelectric material which responds to the pressure of fuel within the nozzle to generate a current sufficient to spark across a gap to ignite fuel within the fuel combustion chamber of a reciprocating piston engine or other type of engine.

Another broad object of the invention can be to provide an ignition aid which allows or improves the performance of compression ignition and spark ignition engines utilizing ethanol or other types of bio-fuels, including, but not limited to, ethanol or blends of Avgas and ethanol.

Another broad object of the invention can be to replace conventional spark ignition systems which utilize a spark plug or ignition coil to ignite fuel in the combustion chamber of a reciprocating piston or other type of engine.

Another broad object of the invention can be to replace convention spark ignition systems on aircraft engines.

Naturally, further objects of the invention are disclosed throughout other areas of the specification and drawings.

IV. A BRIEF DESCRIPTION OF THE DRAWINGS

V. MODE(S) FOR CARRYING OUT THE INVENTION

A fuel injection system providing both fuel injection devices and methods of fuel injection for internal combustion engines in which a piezoelectric material generates a current discharged to ignite fuel delivered into the engine combustion chamber.

Figure 1:
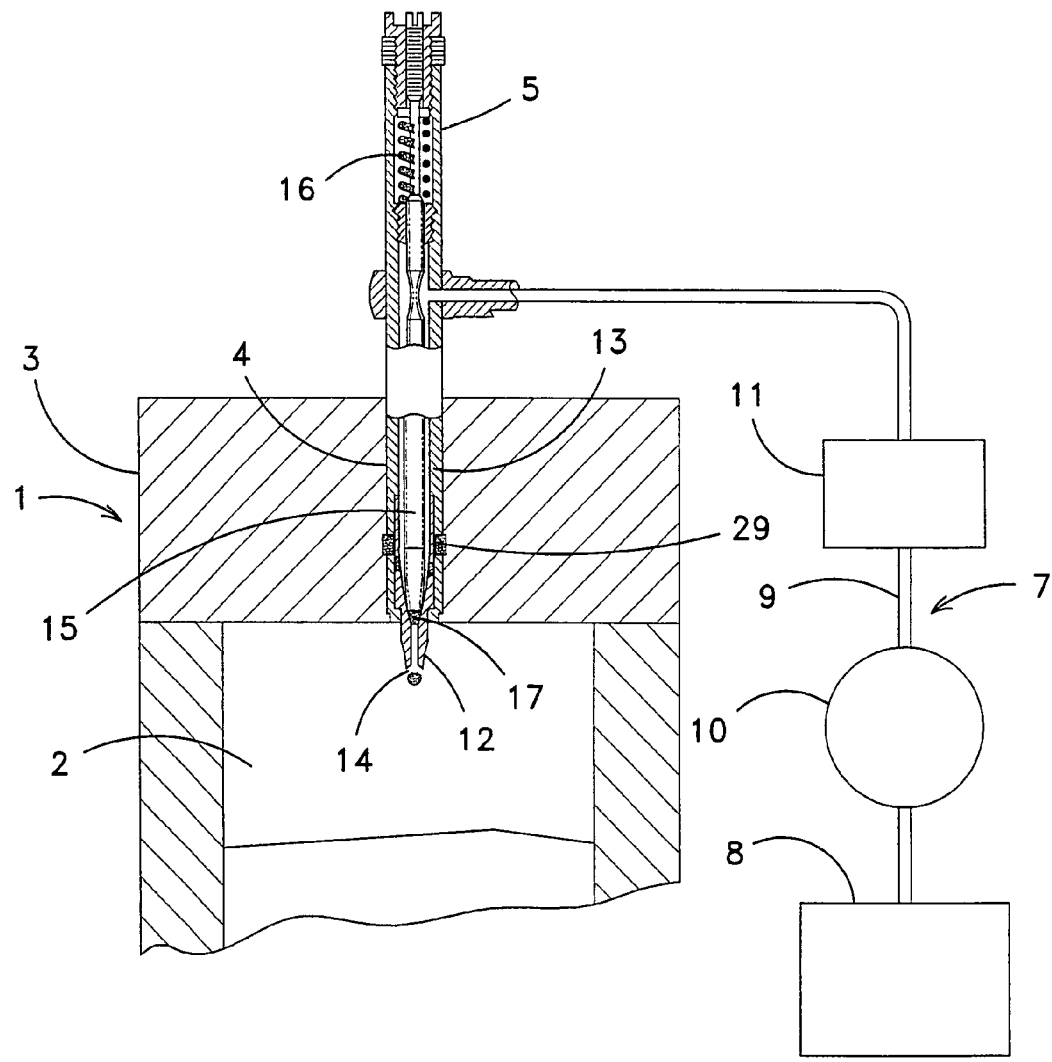
FIG. 1 shows an embodiment of the fuel injection spark ignition invention which operates to ignite fuel in a fuel combustion cylinder.

Now referring primarily to FIG. 1, an exemplary engine and fuel injection system in accordance with the invention is shown. The engine (1) may contain one or more fuel combustion chambers (2). The engine (1) has at least one cylinder head (3) having a fuel injector bore (4) which communicates with each fuel combustion chamber (2). A fuel injector (5) can be adapted to fit in each fuel injector bore (4).

A fuel system (7) provides a fuel source (8), such as a fuel tank, and a fuel supply passage (9) which communicates between the fuel source (8) and the fuel injector (5). A fuel transfer means (10), such as a fuel pump, delivers fuel from the fuel source (8) through the fuel passage (9) to the fuel injector (5). With respect to certain embodiments of the invention, a fuel return passage (not shown in the figure) may communicate between the fuel injector (5) and the fuel supply (8). The cylinder head (3) can define a portion of the fuel passage (9) or a portion of the fuel return passage, or both, as to certain embodiments of the invention. One or more fuel filters (11) may be can be arranged in fluid communication between the fuel supply (8) and the injector(s) (5).

It should be understood that this exemplary embodiment of the engine and fuel injection system is not intended to be limiting with regard to the scope of the invention, but rather illustrative of the numerous and varied reciprocating internal combustion engines, whether diesel, spark ignition, rotary engines, turbine, modified cycle engines, or the like, that may be used in aircraft, automobiles, motorcycles, snowmobiles, lawnmowers, or otherwise, that can be operated in accordance with the invention.

Similarly, while FIG. 1 shows an exemplary fuel injector, it is not intended that the type of fuel injector shown be limiting with regard the scope of the invention, but rather illustrative of the numerous and varied fuel injectors that may be operated in accordance with the invention. Specifically without limitation fuel injectors such as those manufactured by Rossa-Master, Cummins, or other fuel injectors as above-discussed, or similar or otherwise, may be operated in accordance with the invention.

Again referring primarily to FIG. 1, in a preferred embodiment of the invention, the fuel injector (5) has a nozzle (12) which defines the configuration of a nozzle chamber (13) which has at least one fuel injection orifice (14). The fuel supply passage (9) communicates with the nozzle chamber (13) and the fuel injection orifice (14) communicates with the fuel combustion chamber (2). A injector valve (15) or valve means operates to open and close communication between the nozzle chamber (13) and the fuel combustion chamber (2).

As to certain embodiments of the invention, the injector valve (15) operates in response to fuel pressure within the nozzle chamber (13) sufficient to overcome the force applied to the injector valve (15) by a coil spring (16). When sufficient pressure has built up, the injector valve (15) is lifted off its seat (17) and the fuel is forced through one or more fuel injection orifices (14) into the fuel combustion chamber (2). A check valve (not shown in FIG. 1) can be mounted in the nozzle chamber (13) to prevent gas in the fuel combustion chamber (2) from flowing back into the nozzle chamber (13).

Figure 2:
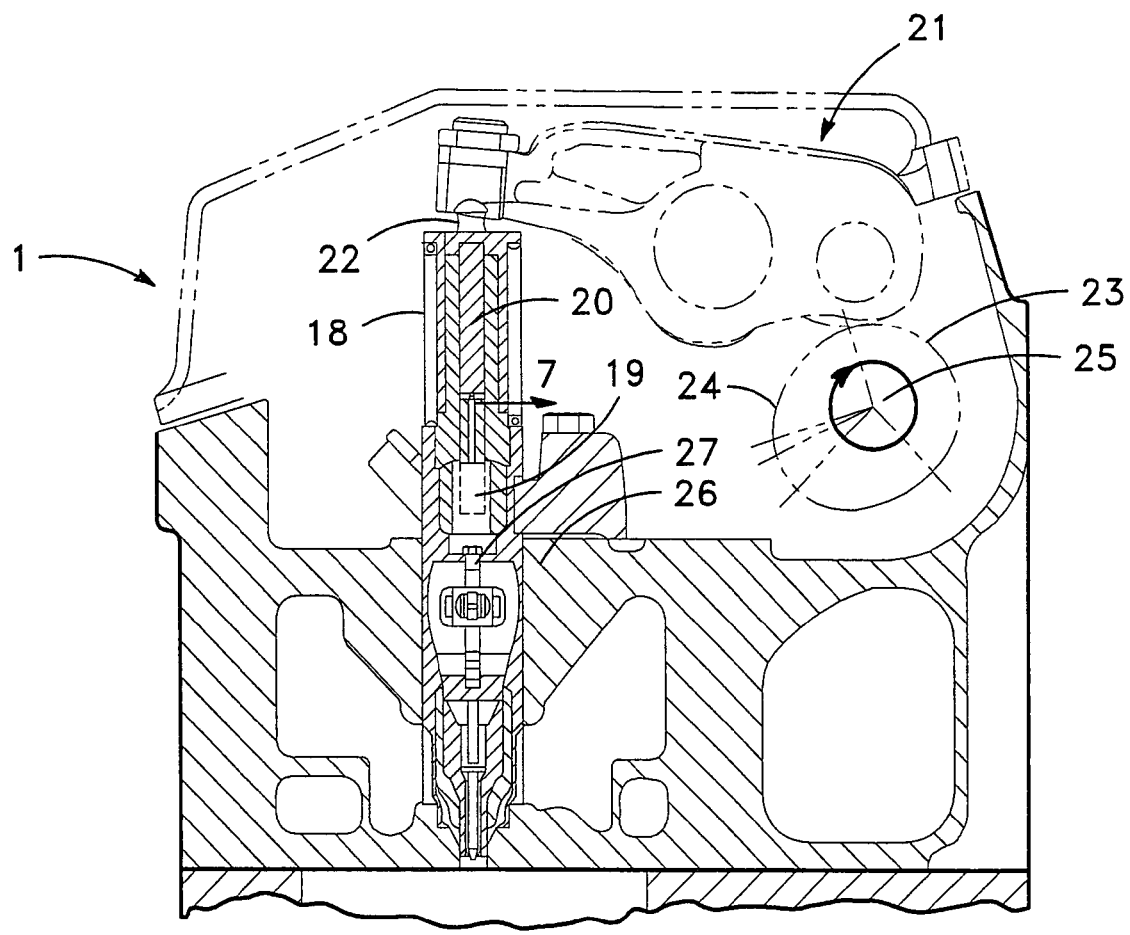
FIG. 2 shows an embodiment of the fuel injection spark ignition invention which further includes fuel pressurization means located within the fuel injector.

Now referring primarily to FIGS. 1 and 2, fuel can be delivered from the fuel supply (8) by the fuel transfer means (10) at sufficient pressure to lift the injector valve (15) from its seat (17). More often, the fuel transfer means (10) delivers fuel at insufficient pressure to lift the injector valve (15) from its seat (17) and a fuel pressure generator (18) disposed within the fuel injector (5) operates to increase pressure of an amount of fuel within the nozzle chamber (13) to a level sufficient to lift the injector valve (15) from its seat (17).

One non-limiting mechanism for increasing fuel pressure delivered to the nozzle chamber is shown by FIG. 2. In that particular embodiment of the invention, a fuel storage chamber (19) communicates with the fuel supply passage (9). A plunger (20) actuatable from a location outside of the fuel injector (5) moves within the fuel storage chamber (19) to pressurize fuel. The plunger actuating means (21) may be any mechanical actuating device or hydraulical actuating device. In the embodiment shown, a tappet (22) and plunger (20) assembly is actuated indirectly or directly by a rotatable cam (23) or cam lobe (24) mounted on an engine (1) driven cam shaft (25). The profile of the cam surface times the plunger (18) movement, plunger stroke, and range of fuel pressures. A fuel control passage (26) communicates between the fuel storage chamber (19) and the nozzle chamber (13). One or more valve means (27) operates to open and close communication between the fuel storage chamber (19) and the nozzle chamber (13).

Electrical actuation means (28) can be provided to operate the one or more valve means (27). For example, the electrical actuation means (28) can include a single solenoid or a plurality of solenoids. The one or more valve means (27) operate to deliver pressurized fuel to the nozzle chamber (13) lifting the injector valve (15) from the seat (15) allowing the fuel to be dispersed into the fuel combustion chamber (2).

Figure 3:
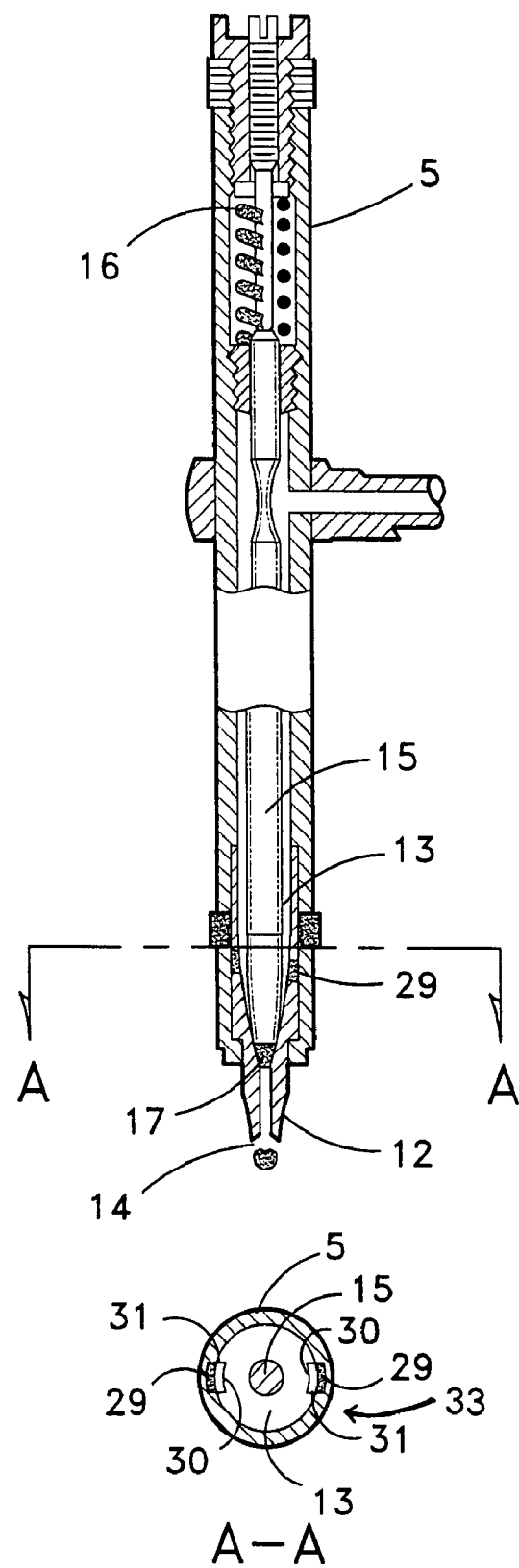
FIG. 3 shows an exemplary embodiment of the invention which provides a fuel injector having a piezoelectric element located in the nozzle chamber which generates an electric current in response to fuel pressure timely discharged across a gap to ignite fuel in the fuel combustion chamber.
Figure 4:
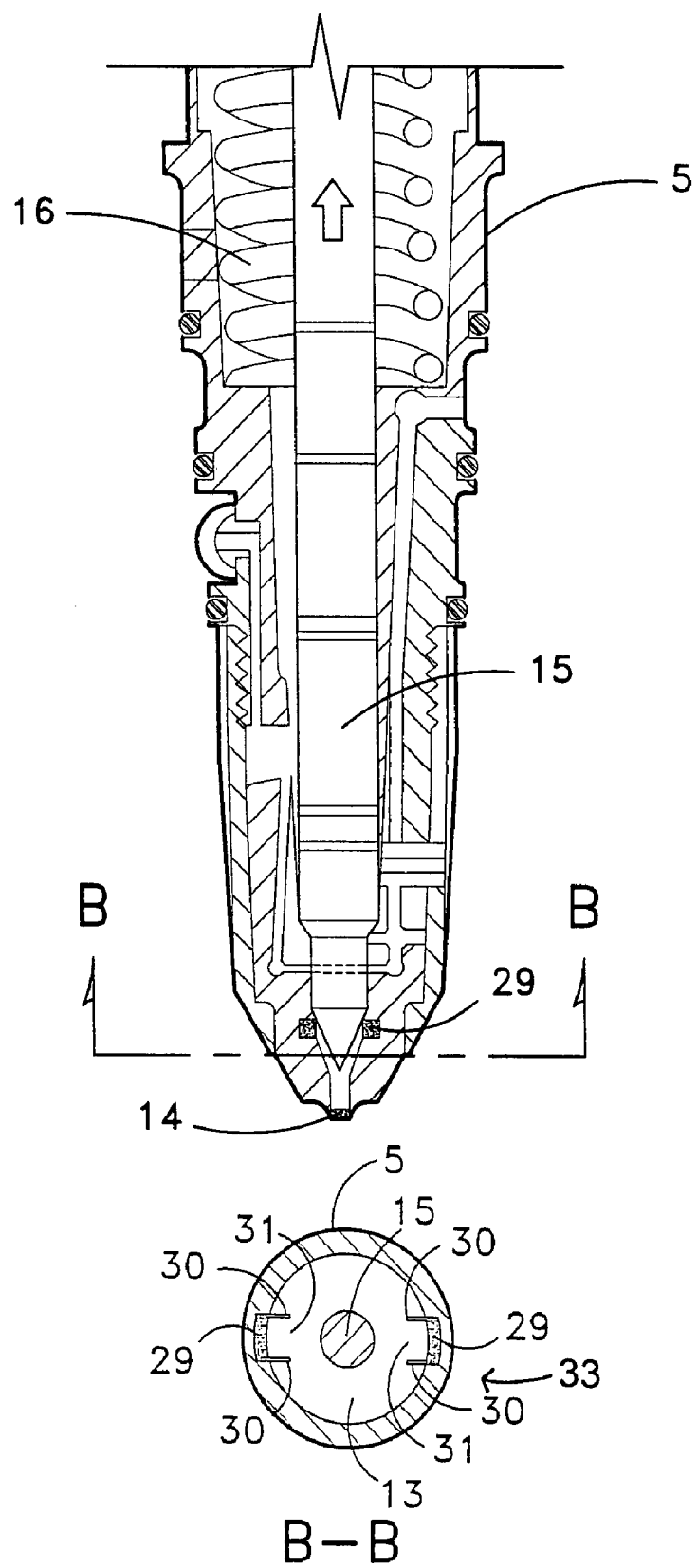
FIG. 4 shows another exemplary embodiment of the invention which provides a fuel injector having a piezoelectric element located in the nozzle chamber which generates an electric current in response to fuel pressure timely discharged across a gap to ignite fuel in the fuel combustion chamber.
Figure 5:
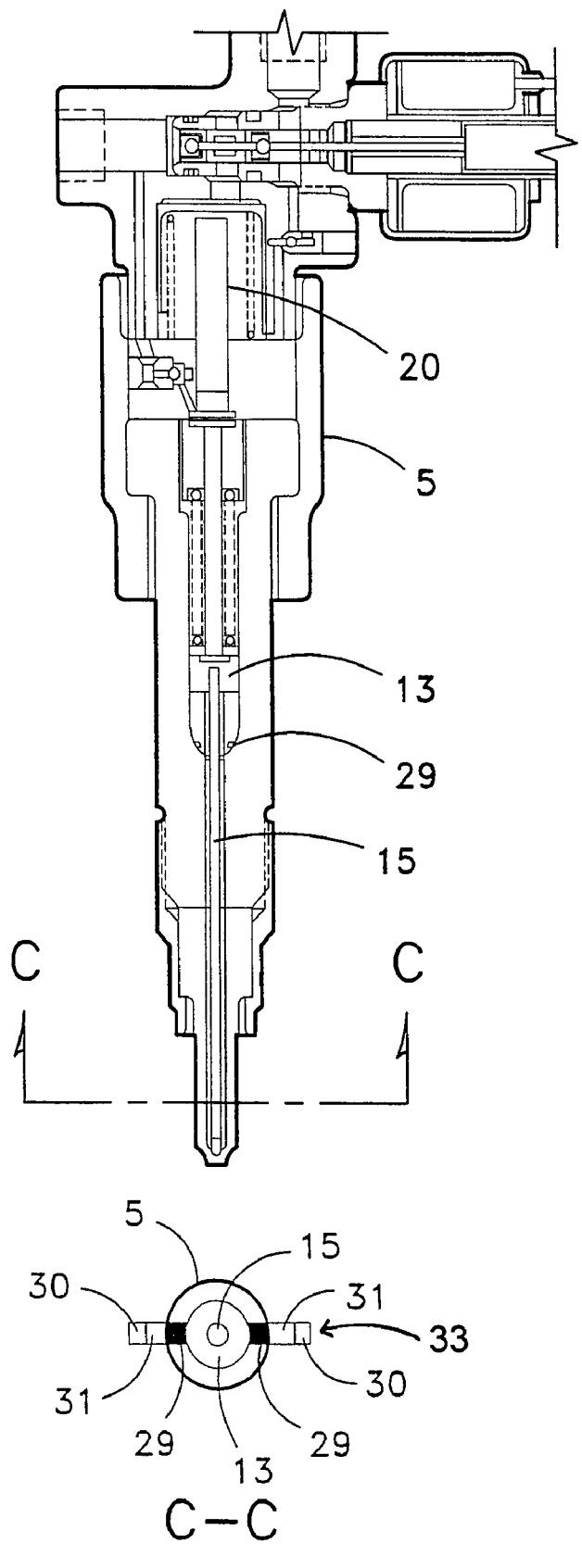
FIG. 5 shows another exemplary embodiment of the invention which provides a fuel injector having a piezoelectric element located in the nozzle chamber which generates an electric current in response to fuel pressure timely discharged across a gap to ignite fuel in the fuel combustion chamber.

Now referring primarily to FIGS. 3, 4, and 5, the fuel injector invention can further include an electric current generator (29) which generates electrical current in response to the fuel pressure in the nozzle chamber (13). For example, the electric current generator (29) can comprise a piezoelectric element, such as a piezoelectric crystal. A piezoelectric element comprises a material or a combination of materials in which positive and negative electrical charges are separated, but symmetrically distributed, so that the piezoelectric element overall is electrically neutral. When the symmetry of the piezoelectric element is in whole or in part disturbed or destroyed the altered charge asymmetry generates a voltage. As a non-limiting example, a one (1) cm cube of quartz with 500 lb (2 kN) of pressure applied upon it, can produce 12,500 V of electricity.

Many other materials, for example, quartz analogue crystals like berlinite ($AlPO_4$) or gallium orthophosphate ($GaPO_4$); ceramic or other material containing one or more of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_1$; lead zirconate titanate (PZT); tourmaline, quartz, or topaz; polymers polyvinylidene fluoride, ($—CH_2—CF_2—)_n$, rubber, wool, hair, wood fiber, and silk, each exhibit piezoelectricity to some extent.

Direct piezoelectricity of some substances like quartz, as mentioned above, can generate thousands of volts. Perhaps the best-known application of piezoelectric elements is the electric cigarette lighter. Pressing the lighter button applies pressure upon a piezoelectric crystal, and the thus produced high voltage ignites the gas as the current jumps over a small spark gap. The portable electrical sparkers used to light gas grills or stoves work the same way.

Now referring primarily to FIGS. 3, 4, and 5, an electric current generator (29) such as a piezoelectric element or piezoelectric crystal can be located in the nozzle chamber (13). The location of the electric current generator (29) can vary from embodiment to embodiment of the fuel injector invention so long as the electric current generator (29) receives sufficient pressure, or change in pressure, on its surface from fuel in the nozzle chamber (13) to generate a current sufficient to discharge or spark across the gap (31). The configuration of the electric current generator (29) and the nozzle (12) can be altered to account for various factors including the internal configuration of the nozzle chamber (13), the external configuration of the valve means (or pintel) (15) which operates within the nozzle chamber (13), the amount of surface area of the electric current generator (29) on which fuel pressure is applied, the amount of current to be generated to induce or generate a discharge of the current or spark across the gap (31), or the like.

The electric current generator (29) can be electrically isolated from the nozzle (12) to prevent a short circuit of current generated in response to fuel pressure within the nozzle chamber (13). The manner of electrically isolating the electric current generator (29) can vary between embodiments of the fuel injector invention. One non-limiting example provides a insulation layer (32) between the nozzle (12) and the electric current generator (29). Another non-limiting embodiment of the invention provides a nozzle (12) configured from an electrically non-conductive material.

Now referring primarily to FIG. 3, the electric generator element (29) comprises a piezoelectric element configured as part of the nozzle (12) wall. Cross Section AA shows an insulation layer (32) which electrically isolates the negative pole of piezoelectric element from the nozzle (12) wall while the positive pole of the piezoelectric element is grounded to the nozzle (13) wall. An electrical conductor (31) projecting from the negative pole of the piezoelectric element can be configured to provide the gap (31) across which the current generated by the electric current generator (29) can be discharged.

Now referring primarily to FIG. 4, another embodiment of the fuel injector invention provides an electric current generator (29) or piezoelectric element configured as part of the nozzle (13) wall. The electric current generator (29) further includes an insulation layer to sufficient to prevent creation of a short circuit between positive and negative poles. A pair of conductors (30), one each electrically coupled to the positive and negative poles of the electric current generator (29), are disposed to allow discharge of electrical current across the gap (31).

Now referring primarily to FIG. 5, another embodiment of the fuel injector invention provides an electric current generator (29) or piezoelectric element configured as part of the nozzle (13) wall. The electric current generator (29) further includes an insulation layer (32) sufficient to prevent creation of a short circuit between positive and negative poles. A pair of conductors (30), one each electrically coupled to the positive and negative poles of the electric current generator (29), communicate through the wall of the nozzle (13) (each having a sufficient insulation layer to prevent creation of a short circuit) and are disposed outside of the nozzle (13) to allow discharge of electrical current across the gap (31) within the fuel combustion chamber (2).

Again, it should be understood that the exemplary embodiments of the fuel injector invention shown by FIGS. 3, 4, and 5 are not intended to be limiting with regard to the scope of the invention, but rather illustrative of the numerous and varied embodiments of the manner in which the nozzle (13), the electric current generator (29), the insulation layer (32) and the conductor(s) (31) can be configured (including, but not limited to, certain embodiments of the invention which utilize conventional nozzle technology) to generate a spark across a gap (31) to timely ignite fuel injected into the fuel combustion chamber (2). While certain embodiments of the invention shown by the Figures provide a pair of electric current generators (29), alternate embodiments of the invention can include a single electric current generator (29) or a plurality of electric current generators (29) depending upon the application. Additionally, alternate embodiments of the invention can include a single conductor (30) or a pair of conductors (30) disposed to generate the gap (31) across which the electrical current discharges or other constructional forms of a fuel ignition element (33). Moreover, a single fuel injector in accordance with the invention can include a single or a plurality of gaps (31) across which electrical current can be timely discharged simultaneously or serially to ignite fuel in the fuel combustion chamber (2).

Figure 6:
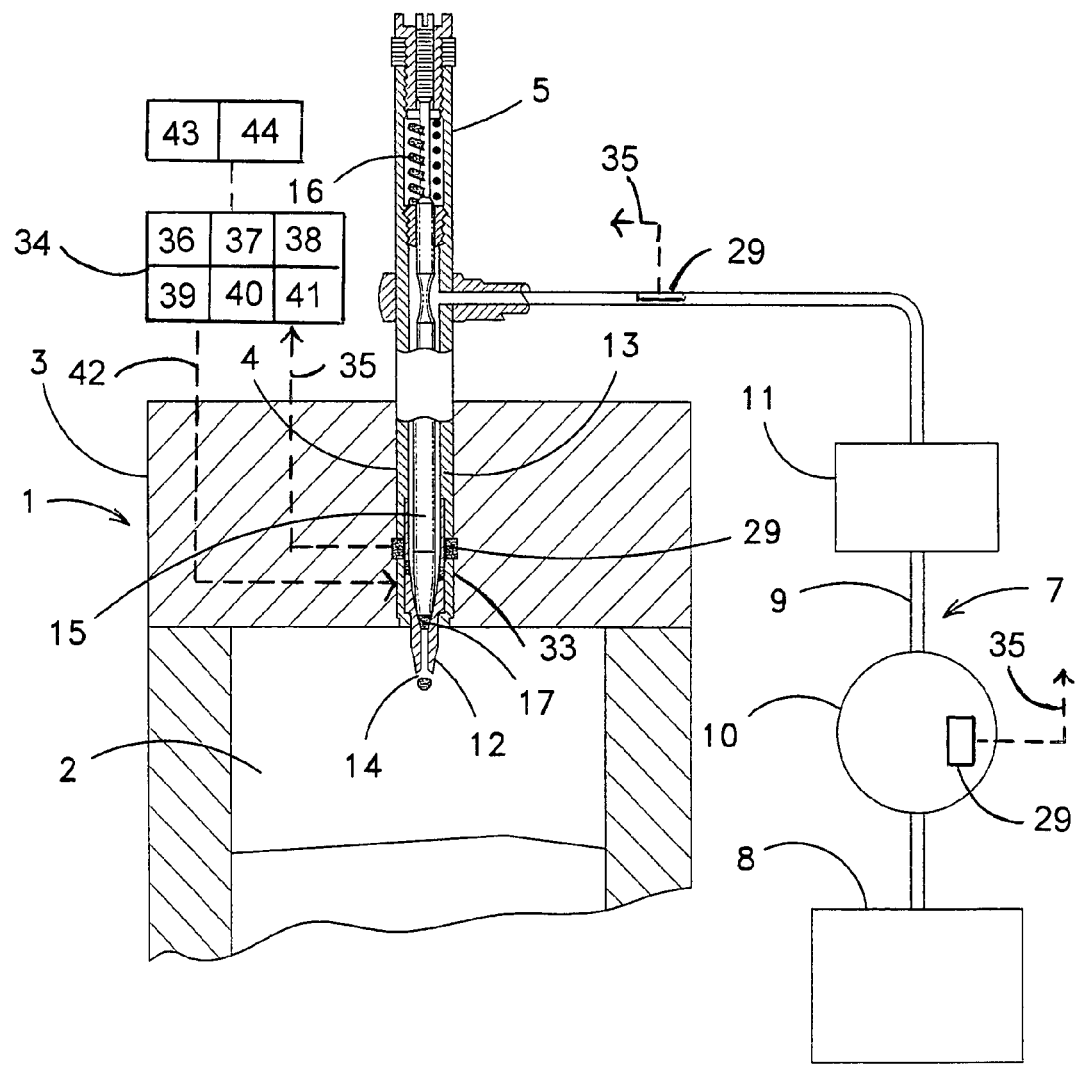
FIG. 6 shows another exemplary embodiment of the invention which provides a piezoelectric element having a location in the fuel transfer means or in the fuel supply passage and can further include a fuel ignition timer coupled to the electrical current generated by the piezoelectric element.

Now referring primarily to FIG. 6, the invention can further include an electric current generator (29) having a location in the fuel system (7) which generates an electric current in response to increased fuel pressure at that location in the fuel system (7). For example, the electric current generator (29) which can comprise a piezoelectric element, as above-described, can be located in the fuel supply passage (9) or in the fuel transfer means (10) and otherwise operate as above-described to generate an electric current which can be discharged by the fuel ignition element (33) (see also FIGS. 3, 4, and 5) at a location to combust the amount of fuel injected into the combustion chamber (2) of the engine (1).

Again referring to FIG. 6, certain embodiments of the invention can further include an ignition timing element (34) electrically coupled to the current generator (29). The current generated by the current generator (29) (regardless of the location of the current generator) can be received by the ignition timing element as a fuel pressure signal (35) which allows adjustment of the time of discharge of the current by the fuel ignition element (33). In a particular embodiment of the invention, the ignition timing element (34) can comprise a computer (36) (as but one example, a modified conventional engine control unit utilized with fuel injected engines to control the timing and duration of the injection of fuel) which provides an analog signal to digital signal converter (37) which converts the continuously varying analog signal (35) from the current generator (29) into a binary signal that represents equivalent information. The analog signal to digital signal converter (37) can be a discrete element such as a Texas Instruments TVP7000, or can be one element of a plurality of elements contained within a microprocessor (38), such as a Microchip Technology, Inc., PIC18F6520 microcontroller with A/D. These specific examples of analog to digital converters (37) and microprocessors (38) are not intended to be limiting with respect to the numerous and varied analog to digital converters (37) which can be used to generate the binary signal which can be processed by correspondingly wide variety of microprocessors (38) which can be included in a wide variety of computer (36) constructional forms or equivalent computers.

The computer (36) can further include one or a plurality of timers (39) and a part of the computer executable instructions (40) can include a timer application (41) which functions to establish an output current (42) for a duration of time variably adjusted based on performance of the engine (1). The output current (42) can be amplified and discharged by the fuel ignition element (33) to timely combust the fuel delivered to the combustion chamber (2). The timing can be adjusted by the computer (36) based upon the fuel pressure signal (35) from the current generator (29) as well as signals from other sensors well known by those skilled in the art such as exhaust oxygen sensor (43) and manifold pressure sensor (44), or the like. For example, a wide band oxygen sensor, such as the Bosch LSU 4.2 Planar Wide Band Lambda Sensor, can provide a relatively wide range response to various air to fuel ratios. Robert BoschGMbH, Technical Customer Information, Planar Wide Band Lambda Sensor, LSU 4.2, 0 258 007/A 258 400, hereby incorporated by reference herein.

As can be easily understood from the foregoing, the basic concepts of the present invention may be embodied in a variety of ways. The invention involves numerous and varied embodiments of a fuel injector having a piezoelectric element which in response to fuel pressure generates a current for spark ignition of the fuel in the corresponding cylinder volume.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "injector" should be understood to encompass disclosure of the act of "injecting"—whether explicitly discussed or not—and, conversely, the disclosure of the act of "injecting", should be understood to encompass disclosure of an "injector" and even a "means for injecting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the fuel injectors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A fuel injector, comprising:
   a. a fuel system, including:
      i. a fuel source containing an amount of fuel;
      ii. a fuel transfer means;
      iii. a fuel supply passage;
   b. a nozzle having a nozzle chamber and a fuel injection orifice, wherein said fuel supply passage communicates with said nozzle chamber, and wherein said fuel injection orifice communicates with a fuel combustion chamber;
   c. a valve means operable to open and close communication between said nozzle chamber and said combustion chamber;
   d. a fuel pressure generator operable to increase pressure of an amount of fuel in said nozzle chamber;
   e. an electric current generator, wherein said electric current generator generates a current in response to increased pressure of said amount of fuel; and
   f. at least one fuel ignition element disposed to generate a discharge of said electric current to combust said amount of fuel in said combustion chamber.

2. A fuel injector as described in claim 1, wherein said fuel pressure generator operable to increase pressure of an amount of fuel in said nozzle chamber operates to increase fuel pressure sufficiently to generate said electrical current from said electric current generator, and wherein said fuel pressure generator further operates to increase fuel pressure sufficiently to open said valve means between said nozzle chamber and said combustion chamber.

3. A fuel injector as described in claim 1, wherein said fuel pressure generator operable to increase pressure of an amount of fuel in said nozzle chamber comprises a fuel pressure generator disposed within said fuel transfer means or within said fuel injector.

4. A fuel injector as described in claim 3, wherein said fuel pressure generator disposed within said fuel injector comprises:
   a. a fuel storage chamber which communicates with said fuel supply passage;
   b. a plunger actuatable from a location outside the fuel injector movable within said fuel storage chamber to pressurize fuel;
   c. a fuel control passage which communicates with said fuel storage chamber and said nozzle chamber; and
   d. a second valve means operable to open and close communication between said fuel control passage and said nozzle chamber.

5. A fuel injector as described in claim 1, wherein said electric current generator has a configuration which generates an electrical current sufficient to generate a discharge of said electric current across a gap in said fuel ignition element.

6. A fuel injector as described in claim 1, wherein said electric current generator comprises a piezoelectric element.

7. A fuel injector as described in claim 6, wherein said piezoelectric element is selected from the group of piezoelectric materials consisting of lead zirconate titanate, tourmaline, quartz, quartz analogue crystals, topaz, berlinite, gallium orthophosphate, perovskite, tugsten-bronze, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$; ceramic containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$, and a material containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$.

8. A fuel injector as described in claim 6, wherein said electric current generator has a location within selected from the group consisting of:
   a location within said fuel transfer means, a location within said fuel supply passage, and a location within said nozzle chamber.

9. A fuel injector as described in claim 1, where said combustion chamber comprises the combustion chamber of a reciprocal piston engine.

10. A fuel injector as described in claim 9, wherein said reciprocal piston engine comprises an aircraft engine.

11. A fuel injector as described in claim 9, wherein said reciprocal piston engine is selected from the group consisting of an automotive engine, a motorcycle engine, a lawnmower engine, a single piston engine, a two stroke engine, a four stroke engine, and an aircraft engine.

12. A method of operating a fuel injector, comprising the steps of;
   a. supplying an amount of fuel to a nozzle chamber;
   b. pressurizing said amount of fuel in said nozzle chamber;
   c. generating an electrical current from an electric current generator responsive to an amount of pressure of said amount of fuel;
   d. opening communication between said nozzle chamber and a fuel combustion chamber;
   e. injecting said amount of fuel into said fuel combustion chamber; and
   f. discharging said electric current generated by said electric current generator to initiate combustion of said fuel injected into said combustion chamber.

13. A method of operating a fuel injector as described in claim 12, wherein said step of pressurizing said amount of fuel in said nozzle chamber comprises the step of pressurizing said amount of fuel in said nozzle chamber sufficiently to generate said electrical current from said electric current generator and open communication between said nozzle chamber and said fuel combustion chamber to inject said amount of fuel into said fuel combustion chamber.

14. A method of operating a fuel injector as described in claim 12, wherein said step of supplying an amount of fuel to a nozzle chamber comprises the step of supplying said amount of fuel at a supply pressure insufficient to generate said electrical current from said electric current generator and open communication between said nozzle chamber and said fuel combustion chamber to inject said amount of fuel into said fuel combustion chamber, and wherein said step of pressurizing said amount of fuel in said nozzle chamber comprises pressurizing said amount of fuel with a fuel pressurization means disposed within said fuel injector.

15. A method of operating a fuel injector as described in claim 14, wherein said step of pressurizing said amount of fuel with fuel pressurization means disposed within said fuel injector comprises the steps of:
   a. storing said amount of fuel in a fuel storage chamber which communicates with said fuel supply passage and said nozzle chamber;
   b. actuating a plunger movable within said fuel storage chamber from a location outside of said fuel injector to pressurize said fuel;
   c. closing said fuel storage chamber in response to a level of fuel pressure insufficient to generate said electrical current from said electric current generator; and
   d. opening said fuel storage chamber in response to a level of fuel pressure within said fuel storage chamber sufficient to generate said electrical current from said electric current generator; and
   e. delivering said amount of fuel to said nozzle chamber.

16. A method of operating a fuel injector as described in claim 12, further comprising the step of locating said electrical current generator within said nozzle chamber.

17. A method of operating a fuel injector as described in claim 16, wherein said electrical current generator comprises a piezoelectric element.

18. A method of operating a fuel injector as described in claim 17, wherein wherein said piezoelectric element is selected from the group of piezoelectric materials consisting of lead zirconate titanate, tourmaline, quartz, quartz analogue crystals, topaz, berlinite, gallium orthophosphate, perovskite, tugsten-bronze, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$; ceramic containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$, and a material containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$.

19. A method of operating a fuel injector as described in claim 12, where said combustion chamber comprises the combustion chamber of a reciprocal piston engine.

20. A method of operating a fuel injector as described in claim 19, wherein said reciprocal piston engine comprises an aircraft engine.

21. A method of operating a fuel injector as described in claim 20, wherein said reciprocal piston engine is selected from the group consisting of an automotive engine, a motorcycle engine, a lawnmower engine, a single piston engine, a two stroke engine, a four stroke engine, and an aircraft engine.

22. A method of manufacturing a fuel injector, comprising the steps of:
   a. providing a fuel system, including:
      i. a fuel source containing an amount of fuel;
      ii. a fuel transfer means;
      iii. a fuel supply passage;
   b. providing a nozzle having a nozzle chamber and a fuel injection orifice, wherein said fuel supply passage communicates with said nozzle chamber, and wherein said fuel injection orifice has a location to communicate with a fuel combustion chamber;
   c. locating a first valve means within said nozzle chamber operable to open and close communication between said nozzle chamber and said combustion chamber;
   d. providing a fuel pressure generator operable to increase pressure of an amount of fuel;
   e. locating an electric current generator in said fuel system, wherein said electric current generator produces an electrical current in response to pressure of an amount of fuel in said fuel system; and
   f. disposing at least one fuel ignition element to generate a discharge of said electric current to combust said amount of fuel in said combustion chamber.

23. A method of manufacturing a fuel injector as described in claim 22, wherein said electrical current generator comprises a piezoelectric element.

24. A method of manufacturing a fuel injector as described in claim 23, wherein said piezoelectric element is selected from the group of piezoelectric materials consisting of lead zirconate titanate, tourmaline, quartz, quartz analogue crystals, topaz, berlinite, gallium orthophosphate, perovskite, tugsten-bronze, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$; ceramic containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$, and a material containing at least one of perovskite, tugsten-bronze, lead zirconate titanate, $BaTiO_3$, $KNbO_3$, $LiNbO_3$, $LiTaO_3$, $BiFeO_3$, $Na_xWO_3$, $Ba_2NaNb_5O_5$, $Pb_2KNb_5O_{15}$.

25. A method of manufacturing a fuel injector as described in claim 22, wherein said step of providing a fuel pressure generator operable to increase pressure of an amount of fuel in said nozzle chamber comprises the step of disposing a fuel pressurization means within said fuel injector.

26. A method of manufacturing a fuel injector as described in claim 25, further comprising the step of disposing a fuel pressurization means within said fuel injector comprises:
   a. providing a fuel storage chamber which communicates with said fuel supply passage and said nozzle chamber;
   b. providing a plunger movable within said fuel storage chamber from a location outside of said fuel injector to pressurize an amount of fuel within said fuel storage chamber; and
   c. locating a second valve means operable to open communication with said nozzle chamber in response to a level of fuel pressure within said fuel storage chamber sufficient to generate said electrical current from said electric current generator located within said nozzle chamber.

27. A method of manufacturing a fuel injector as described in claim 22, where said combustion chamber comprises the combustion chamber of a reciprocal piston engine.

28. A method of manufacturing a fuel injector as described in claim 27, wherein said reciprocal piston engine comprises an aircraft engine.

29. A method of manufacturing a fuel injector as described in claim 28, wherein said reciprocal piston engine is selected from the group consisting of an automotive engine, a motorcycle engine, a lawnmower engine, a single piston engine, a two stroke engine, a four stroke engine, and an aircraft engine.

* * * * *